Jan. 28, 1969  C. F. STRAWN  3,424,985
PROPORTIONAL CONTROL CIRCUIT
Filed Jan. 13, 1964
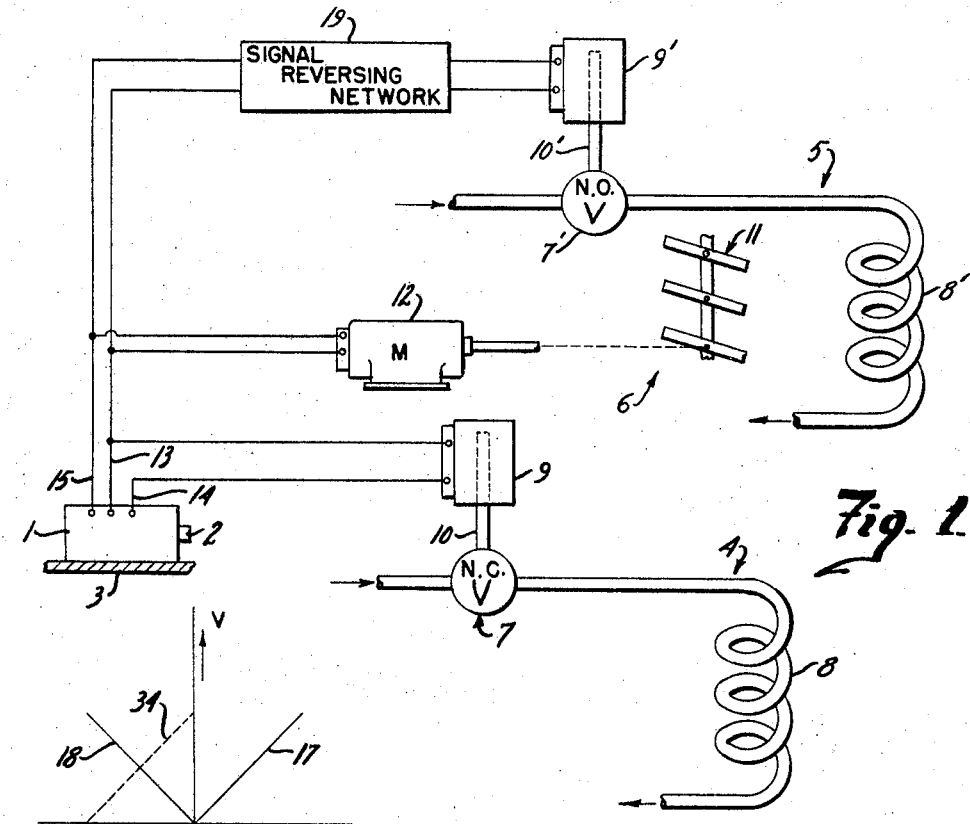
Fig. 1.
Fig. 2.
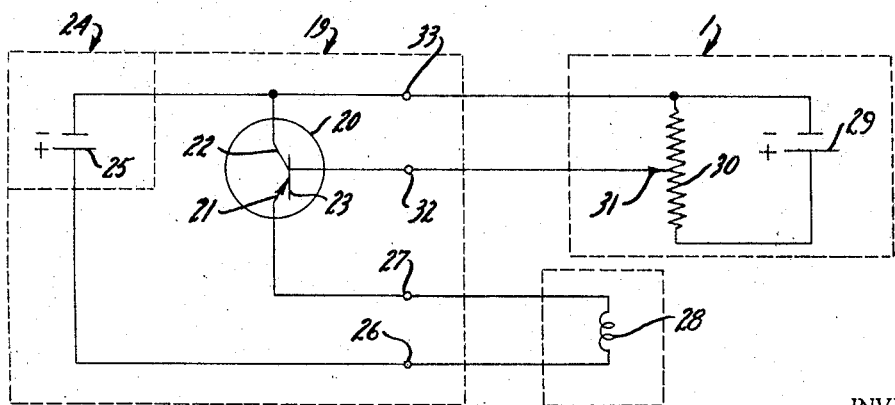
Fig. 3.
INVENTOR.
CHARLES F. STRAWN
BY
Andrus & Starke
Attorneys

United States Patent Office 3,424,985
Patented Jan. 28, 1969

3,424,985
PROPORTIONAL CONTROL CIRCUIT
Charles F. Strawn, Arlington, Tex., assignor to Johnson Service Company, Milwaukee, Wis., a corporation of Wisconsin
Filed Jan. 13, 1964, Ser. No. 337,440
U.S. Cl. 328—3      4 Claims
Int. Cl. G01k 7/00; G08b 19/00

ABSTRACT OF THE DISCLOSURE

A temperature responsive signal source provides a direct current voltage proportional to the condition sensed and is connected to operate a valve in a proportional manner and through a signal reversing network to operate another valve in a reverse manner. The signal reversing network includes an emitter-follower connected transistor having a battery connected in series with a load between the emitter and collector with the load connected in the emitter lead. The signal source is connected across the base and the collector of the transistor with the corresponding polarity of the battery and source connected to the collector. The load voltage is equal to the difference between the D.C. voltages because the emitter to base junction does not present significant voltage drop. As the signal voltage increases, it subtracts from the battery voltage in the above series circuit and reduces energization of the load.

---

This invention relates to a control circuit and particularly to a reversing circuit or network which accepts a varying direct current input signal and provides a reversely varying direct current output signal.

In control systems, a controller may generate a direct current signal in accordance with a condition such as temperature, humidity, flow or other physical variable to be controlled and then operate one or more devices in response thereto. Although the controlled devices may be actuated directly in accordance with the magnitude of a generated voltage, certain devices may require inverse actuation wherein as the generated signal voltage increases, the voltage applied to the control device decreases and vice versa.

Although the present invention may be employed in any suitable control system wherein it is desirable to reverse the action of a voltage signal during the control cycle, it is hereinafter described in connection with a temperature control system for purposes of clearly explaining the present invention. Other applications will be obvious to those skilled in the art from the following description of the invention.

The present invention is particularly directed to a reliable and long life reversing circuit or network which can be constructed without moving parts and can be predesigned to avoid necessity of field adjustment.

In accordance with the present invention, a transistor or other similar component includes a bias and operating direct current source connected in an output circuit. The direct current source provides the maximum operating voltage for any desired load. The input circuit of the transistor includes a condition responsive controller which generates or provides a direct current voltage in accordance with a sensed condition. The output of the controller is connected in the input circuit of the transistor and the transistor is operated such that with the input voltage level of the controller applied to the input circuit the voltage applied to the load is the difference between the operating voltage source and the controller output.

In operation, an increasing voltage from the variable voltage source is subtracted from the voltage of the bias voltage source such that the net net voltage applied to the load is reduced. A decreasing voltage similarly increases the load voltage to the maximum level provided by the direct current source in the output circuit.

The reversing network of the present invention may readily and advantageously be constructed as a compact, self-contained module with input and output leads for direct connection in a control circuit. The operating voltage source may be a small transformer and a full wave rectifier employing solid state devices which can be encapsulated as a part of the module with input leads for connection to an appropriate power source.

The present invention can be particularly advantageously interconnected to sequentially operate a plurality of controlled devices such as individual cooling and heating means in a temperature control system or the like wherein separate signal voltages from a controller are generated in response to an increase and a decrease in the temperature level from a set point. The heating and cooling means may also have a normally opened and closed condition such that in the event of a power failure heating would be maintained. Such a system would be necessary in cold climates whereas a reverse selection would be made for hot climates. When the temperature being regulated is at the desired level, the controller output is at the set or null point and both the cooling and heating means should be closed. However, the heating means is normally open and consequently must be energized with full voltage so as to be held closed. In accordance with the present invention, the reversing network is inserted between the controller and the heating means to provide proper operation. If the temperature falls below the selected level by a predetermined amount or band width an increased output signal results. However, the reversing network reduces the power applied to the heating means which is actuated to the normally open position and provides heat until the temperature rises to the selected level. The cooling means would be inoperative being in the set position. If the temperature rises from the set point, the first or heating device would be in its fully operated position. The increased signal fed to the cooling means would however actuate it to reduce the temperature level.

The present invention thus provides a very simple, reliable and long life network which can be formed as a compact, self-contained module and interconnected with a previously designed circuit to provide a reversing function in a direct current control system.

The drawing furnished herewith illustrates a preferred application and construction of the present invention.

In the drawing:
FIG. 1 is a diagrammatic view of the present invention incorporated into a temperature control system;
FIG. 2 is a graphic illustration generally showing the temperature versus voltage characteristics of a temperature sensing controller; and
FIG. 3 is a schematic circuit diagram of a reversing circuit shown diagrammatically in FIG. 1.

Referring to the drawings and particularly to FIG. 1, the illustrated temperature control system includes a controller 1 having a temperature sensing element 2 and mounted within an enclosure of which only a fragmentary wall portion 3 is shown.

The controller 1 provides an electrical signal in accordance with the output of element 2 to control a conditioning system comprising a cooling unit 4, a heating unit 5 and an air ventilating unit 6.

The cooling unit 4 includes a valve 7 for controlling the introduction of a temperature control fluid into an associated cooling coil 8. Valve 7 is a normally closed valve of any suitable construction to respond to energization by a direct current. An electro-hydraulic valve having an actuator 9 coupled to position a rectilinearly moving valve stem 10 is diagrammatically shown in FIG. 1.

The heating unit 5 is similarly constructed and corresponding elements are identified by primed numbers. The valve 7', however, is a normally open valve.

The ventilating unit 6 includes a damper 11 for controlling the admission of fresh air into the enclosure. The damper 11 is selectively positioned by a damper motor 12 in response to the output of controller 1.

The controller 1 is illustrated as a known three wire unit having a common lead 13, a cooling lead 14 and heating lead 15 such as sold by the assignee of this application and also shown in U.S. Patents 3,240,948 and 3,243,597. The output of the controller 1 is graphically shown in FIG. 2 with the output voltage level plotted on the vertical axis and temperature variation on the horizontal axis.

The illustrated intersection of the temperature and voltage axis is the null or setpoint 16 at which a zero output signal appears between the common lead 13 and the respective leads 14 and 15.

The graph line 17 in the first or upper right quadrant of FIG. 2 indicates the temperature versus voltage conditions taken between the common lead 13 and the cooling line 14.

A similar graph line 18 in the second or upper left quadrant of FIG. 2 is taken between common lead 13 and the heating lead 15.

As the temperature varies in a rising direction from the setpoint 16, the direction current voltage on lead 14 increases with respect to the common lead 13 as shown by the graph line 17. This signal is applied to the cooling unit 4 to reduce the temperature. As the temperature changes in a falling direction from the setpoint 16, the direct current voltage between the lead 15 and the common lead 13 increases as shown by the graph line 18. This increasing signal is applied to the heating unit 5 and the ventilating unit 6 to increase the temperature as hereinafter described.

The actuator 9 for the cooling valve 7 is connected directly between leads 13 and 14 to actuate the related valve 7 in accordance with the output voltage of the controller 1 when the temperature increases above a selected level.

The actuator 9' for valve 7' of heating unit 5 and the damper motor 12 are controlled by the voltage between the leads 13 and 15. Motor 12 is directly connected to the leads 13 and 15. The operation of valve 7' however must be reversely actuated as hereinafter described.

In accordance with the present invention, a reversing network unit 19, shown by a properly labeled block in FIG. 1 and by a preferred schematic circuit in FIG. 3, is inserted between the controller 1 and the valve actuator 9'. The network 19 creates a direct current output which varies inversely with the input signal voltage. In the absence of an input signal, the network 19 provides a maximum output voltage which is applied to actuator 9' to hold the normally open valve 7' in the closed position. This corresponds to the setpoint 16 with the temperature at the proper level and the valve 7' therefore closed.

Referring particularly to FIG. 3, the preferred reversing network unit 19 is schematically shown. The circuit of FIG. 3 includes a PNP transistor 20 interconnected in the reversing network circuit as an emitter follower and having in accordance with the usual connotation an emitter 21, collector 22 and a base 23. The collector 22 constitutes a common input-output terminal with the control unit 1 connected between the collector 22 and the base 23. The actuator 9' is connected between the collector 22 and the emitter 21 in series with a direct current voltage source 24; with the actuator 9' disposed between the emitter and the voltage source.

In FIG. 3, the voltage source 24 is schematically shown as a battery 25 having the polarity indicated by the usual polarity signs (+) and (—) applied to the opposite sides or plates thereof. In commercial practice, voltage source 24 preferably includes an appropriate transformer having a pair of rectifying diodes and filtering components providing a full wave direct current. A Zener diode is connected in the circuit to provide a selected operating voltage in the collector-emitter circuit of transistor 20. Such a power source can, with transistor 20, provide a small and compact reversing network which can be readily encapsulated within a protective tube formed of suitable material such as a phenolic material and which is filled with an epoxy resin or the like. Such a unit would operate reliably for long periods and can be easily installed with a minimum of technical knowledge and skill.

For the illustrated PNP transistor illustrated, the negative side of source 24 is connected directly to the collector 22. The positive side is connected to a terminal 26 which constitutes a positive output terminal also connected to one side of actuator 9'. A negative output terminal 27 is connected to the emitter 21 and to the opposite side of actuator 9'.

The actuator 9' is shown diagrammatically in FIG. 3 with a control winding 28 connected between output terminals 26 and 27 of the reversing network 19. The winding 28 may control a fluid valve, not shown, for a hydraulic cylinder or the like which is coupled to position the valve stem 10, in accordance with well known and available units.

The controller 1 constitutes a variable voltage source and is schematically shown in FIG. 3 as including a battery 29 with the indicated polarity. Battery 29 is connected across a potentiometer which includes movable tap 31 disposed to the positive side of the potentiometer. The tap 31 is connected to the positive or base input terminal 32 of the transistor 20. The negative side of the battery 29 forms a negative output terminal which is connected to the collector terminal 33 of the PNP transistor 20.

The battery 25 provides the maximum required output voltage of the reversing network 19 for proper operation of the actuator 9'. With the transistor 20 connected in the emitter follower circuit, the voltage applied to the load winding 28 is the algebraic sum of the fixed voltage of battery 25 and the variable voltage between tap 31 and the negative side of the potentiometer 30. The voltages are in opposition and the voltage applied to the load winding 28 is the difference between the two. The battery 24 provides the maximum required output voltage such that with the input voltage biases the transistor 20 to conduct, substantially full output voltage is applied to the winding 28. As the forward bias voltage increases, the output voltage decreases with a resulting lower voltage applied to winding 28. As a result, valve 7' returns to the normal open position to create a heating effect.

Referring to FIG. 2, the output of the reversing network 19 is shown by the dotted graph line 34 in the second quadrant. The output characteristic is seen to be the inverse of the input line 18 and to have an opposite slope which is also the same as the slope of the graph line 17.

The operation of FIGS. 1 and 3 is briefly summarized starting with the temperature within the enclosure at setpoint 16. Valve 7 of the cooling means 4 is in the normally closed position with the zero output voltage between common lead 13 and cooling lead 14 from the controller 1.

Valve 7' of the heating means on unit 5 is also fully closed as a result of the reversing network 19 which applies maximum voltage to the actuator 9' with the zero output voltage between leads 13 and 15. The damper motor 12 is de-energized and the damper 11 is open to introduce fresh air into the system.

If the temperature drops below the set or null point by a selected number of degrees for any reason; for example, a decrease in the outside air temperature, the voltage between lines 13 and 15 increases. The increased voltage signal is applied directly to the damper motor 12 to reduce the outside air introduced into the enclosure. The signal is also applied to the reversing network 19 to open valve 7'. The increased signal applied to the reversing network 19 results in a corresponding decreased signal in accordance with the characteristic of line 34 in FIG. 2. The decrease in signal applied to the actuator 9' of heating valve 7' results in a reversion of this valve toward the normally open position providing flow of heating fluid through the heating coil 8'. Heat will be supplied until the temperature increases and the sensitive element 2 reduces the signal between the line 15 and the neutral line 13 to re-establish the standby or null position.

In accordance with the present invention, the reversing network 19 provides the reversing function with respect to the setpoint to provide the necessary operating voltage and also isolates the input and output circuits.

If the temperature continues to increase above the setpoint 16, the signal between lead 13 and lead 14 increases and is applied to the actuator 9 of the normally closed cooling valve 7. As a result, valve 7 will begin to open to increase the flow of cooling fluid through the associated cooling coil 8. As a result, an increase in temperature beyond a selected band width will cause a cooling of the air within the enclosure until such time as the output of controller 1 returns to the setpoint 16.

In the circuit of FIG. 3, a PNP transistor 20 is shown. An NPN transistor can also be employed with the polarity of the sources appropriately reversed. This, as well as other similar changes, will be obvious to those skilled in the art within the scope of the present invention as defined in the accompanying claims.

The present invention thus provides a simple, reliable and long life circuit which can be inserted in a control circuit to provide a reversely varying control signal. The circuit can be predesigned to eliminate all moving components and eliminate necessity of field settings and adjustments and can be constructed as a small, compact module for direct connection in circuit as a single unit.

Various modes of carrying out the invention are contemplated as being within the scope of the following claims particularly pointing out and distinctly claiming the subject matter which is regarded as the invention.

I claim:
1. In a control system,
   a load to be controlled and having a null position,
   a pair of electrically controlled means connected to conjointly and sequentially control the load in a proportional manner, one of said controlled means being operable below the null position and the other of said controlled means being operable above the null position,
   sensing means coupled to the load and creating a pair of direct current output voltages one of which increases with a selected polarity as the load varies in one direction from the null position and the other of which increases with the same polarity as the load varies in the opposite direction from the null position,
   means connecting one of said controlled means to the sensing means to respond directly to a first of said output voltages, and
   a reversing circuit connecting the second of the controlled means to the sensing means to respond to the second of said output voltages, said reversing circuit providing increasing and decreasing direct current voltages to the second controlled means corresponding to a decreasing and increasing direct current voltage of the second of said output voltages of the sensing means, whereby said control system operates with a constant polarity direct current from the sensing means to provide reverse functional control of the load with respect to the null position in responsible to the second output voltage.

2. The system of claim 1 wherein said reversing network includes,
   a transistor connected as an emitter-follower with a common collector, a base and an emitter,
   a fixed direct current source of a voltage substantially corresponding to the maximum operating voltage of the controlled means, said source being connected between the collector and emitter to reverse bias the corresponding junction,
   means connecting the sensing means between the collector-base junction to forward bias the corresponding junction and selected to establish an output voltage corresponding to the operating range of both said controlled means, and load terminal means connected to said controlled means in series with the emitter, the fixed direct current source, the sening means and the base to actuate the corresponding controlled means.

3. The control system of claim 1 wherein said reversing network has an output proportional to the input and has a maximum output signal with a minimum second output voltage from the sensing means and decreasing therefrom in proportion to an increase in the second output voltage.

4. The control system of claim 1 wherein said reversing circuit includes a transistor having an input circuit and an output circuit,
   means connecting the second direct current output voltage of the sening means to said input circuit, and
   a fixed direct current source connected in the output circuit including the transistor and the second of the controlled means in series, the sensing means and the direct current sources being connected with their voltages in series opposition to provide an output control voltage equal to the difference therebetween whereby the control voltage varies in proportional manner with the sensing means and when the output voltage of the sensing means is a maximum the output of the reversing circuit is a minimum and when the output voltage of the sensing means is a minimum the output of the reversing circuit is a maximum.

References Cited

UNITED STATES PATENTS

| | | | |
|---|---|---|---|
| 2,821,639 | 1/1958 | Bright et al. | 307—254 |
| 2,846,630 | 8/1958 | Boyle et al. | 318—20.835 X |
| 2,859,402 | 11/1958 | Schaeve | 307—200 X |
| 2,864,904 | 12/1958 | Jensen | 330—32 X |
| 2,995,712 | 8/1961 | Montgomery | 330—32 X |
| 3,002,802 | 10/1961 | Rich | 330—32 X |
| 3,079,566 | 2/1963 | Ebbinge | 330—32 X |
| 3,121,998 | 2/1964 | Nagata. | |
| 3,168,703 | 2/1965 | Clynes | 330—32 X |
| 3,211,975 | 10/1965 | Burley | 318—471 X |
| 3,323,031 | 5/1967 | Kasper et al. | 318—20.835 X |
| 2,483,450 | 10/1949 | Wolfner | 328—1 |
| 3,028,538 | 4/1962 | Rosenfeld et al | 307—88.5 |
| 3,161,782 | 12/1964 | Vieth | 165—26 |

OTHER REFERENCES

Basic Theory and Application, Department of the Army Technical Manual TM 11–690, March 1959, p. 46 relied on.

ARTHUR GAUSS, Primary Examiner.

J. D. FREW, Assistant Examiner.

U.S. Cl. X.R.

328—1